(No Model.)
D. HOGAN.
BED PAN.
No. 581,588. Patented Apr. 27, 1897.
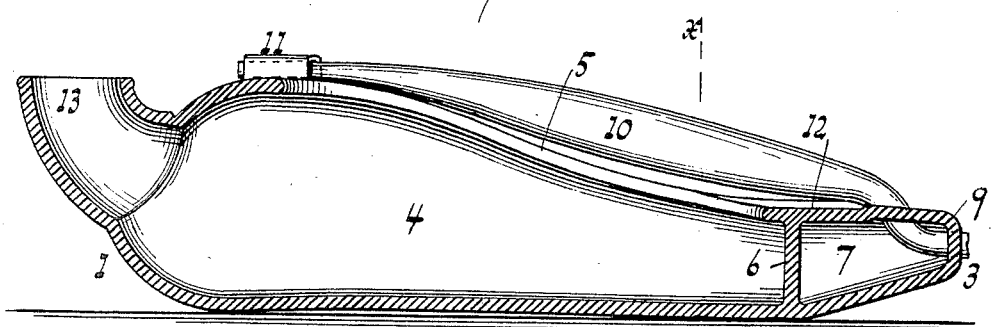
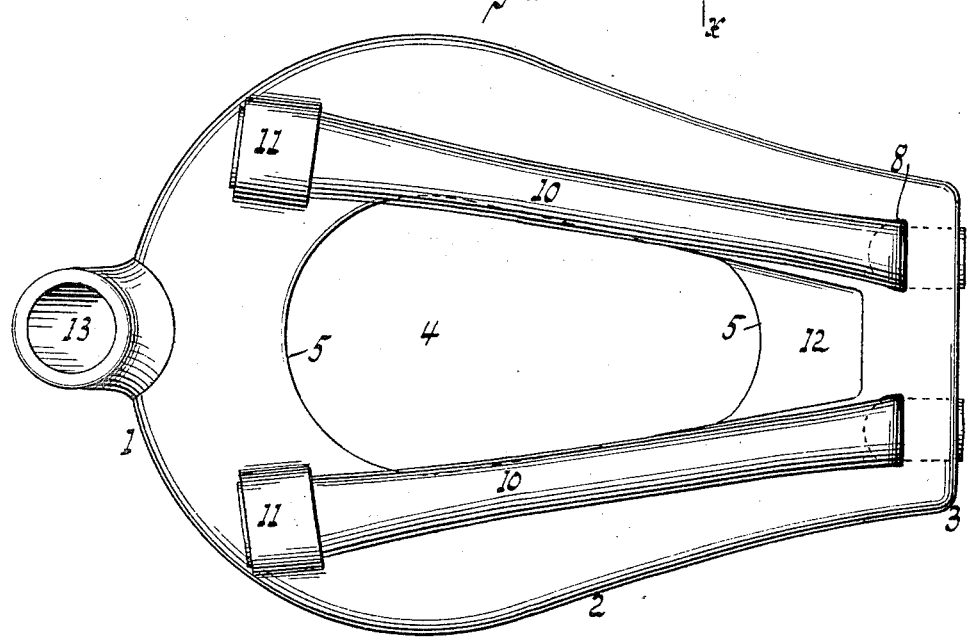
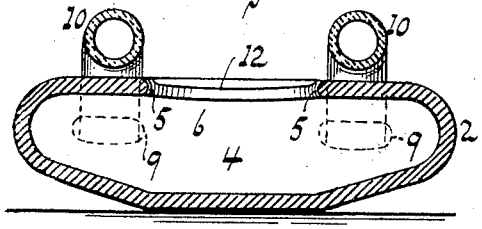
WITNESSES:
William Miller
Chas. E. Poensgen.
INVENTOR
Daniel Hogan
BY Hauff & Hauff
ATTORNEYS

UNITED STATES PATENT OFFICE.

DANIEL HOGAN, OF NEW YORK, N. Y.

BED-PAN.

SPECIFICATION forming part of Letters Patent No. 581,588, dated April 27, 1897.

Application filed October 23, 1896. Serial No. 609,796. (No model.)

*To all whom it may concern:*

Be it known that I, DANIEL HOGAN, a citizen of the United States, residing at New York, in the county and State of New York, have invented new and useful Improvements in Bed-Pans, of which the following is a specification.

This invention relates to a bed-pan which is capable of being given practical shape and considerable capacity and which besides being readily cleaned also avoids distress or adds to the comfort of the user, as set forth in the following specification and claims and illustrated in the annexed drawings, in which—

Figure 1 is a sectional side elevation of the pan. Fig. 2 is a plan view of Fig. 1. Fig. 3 is a section along $x\,x$, Fig. 1.

Bed-pans are frequently made of tapering form, as shown by the pan 1 2 3, having the high part at 1 and tapering or inclining to the low part 3.

The chamber or receiving part 4 of the pan has the mouth or open top 5. The receiving-chamber 4 is closed at one end by a partition at 6, placed a certain distance from the end of the low part 3. The contents of the chamber 4 can thus not flow into the low or contracted space 7 between the partition 6 and the pan end 3. As such contracted space is at times difficult to clean, the pan by shutting off chamber 4 from space 7 can be more readily kept clean and inoffensive. Said space 7 is made accessible by upper and end holes or perforations 8 and 9, which enable any foreign matter that may enter such space to be removed.

Lateral supports 10 are secured by eyes or attaching portions 11 to the bed-pan, said supports being passed through the openings or holes 8 and 9. These supports 10 are made of suitable soft material—as, for example, rubber tubing—and as the bed-pan rests or is passed under a reclining person the supports 10 come on each side of the spine, so that the latter is kept clear or out of contact and pain or annoyance of the patient is avoided or eased.

At its lower portion at the edge or mouth 5 the pan has a depression or leveling 12, which has a tendency to keep tender parts clear or out of contact during the use of the pan. At its high part 1 the pan has an entrance or spout 13, by which the pan can be emptied even when the latter is being used, as, for example, by means of a syringe or suction or discharge hose. By making the pan-bottom flat the pan is secure against tilting or upsetting.

The pan is made of any suitable material, as known.

The supports 10 are shown passed through openings 8 and 9, but could also be passed merely through opening 8, if seen fit.

What I claim as new, and desire to secure by Letters Patent, is—

1. A bed-pan having its receiving-chamber closed by a partition arranged a distance from the low end of the pan, openings in the low end of the pan, and lateral yielding supports connected at one end with the high part of the pan and inserted at the other end into the openings in the low end thereof, substantially as described.

2. A bed-pan having attachments at its high portion and having its receiving-chamber closed by a partition placed a certain distance from the end of the low part of the pan, said low part outside the partition having upper and end openings, and lateral soft supports secured by or passed into said attachments and upper openings substantially as described.

3. A bed-pan having the chamber 4, partition 6, clips 11, at the high part, openings 8 in the low part, and independent soft supports 10, the ends of which engage said clips and said openings, substantially as described.

In testimony whereof I have hereunto set my hand in the presence of two subscribing witnesses.

DANIEL HOGAN.

Witnesses:
WM. C. HAUFF,
E. F. KASTENHUBER.